(12) United States Patent
Soong et al.

(10) Patent No.: US 7,469,146 B2
(45) Date of Patent: Dec. 23, 2008

(54) RADIO LINK MANAGEMENT BASED ON RETRANSMISSION REQUEST PERFORMANCE

(75) Inventors: Anthony C. K. Soong, Superior, CO (US); Tao Wu, Carlsbad, CA (US); Thawatt Gopal, San Diego, CA (US); Young C. Yoon, San Diego, CA (US); Shiau-He Shawn Tsai, San Diego, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 523 days.

(21) Appl. No.: 10/889,554

(22) Filed: Jul. 12, 2004

(65) Prior Publication Data
US 2005/0032522 A1    Feb. 10, 2005

Related U.S. Application Data

(60) Provisional application No. 60/486,157, filed on Jul. 10, 2003.

(51) Int. Cl.
*H04Q 7/20* (2006.01)
(52) U.S. Cl. .................... 455/453; 455/452.1
(58) Field of Classification Search ................ 455/421, 455/438, 434, 442, 439, 436, 453, 452.1, 455/525, 452.2; 370/237, 329, 352, 328, 370/332, 353
See application file for complete search history.

(56) References Cited

U.S. PATENT DOCUMENTS

| 5,487,072 | A | | 1/1996 | Kant |
| 5,507,035 | A | * | 4/1996 | Bantz et al. .................. 455/133 |
| 5,546,411 | A | | 8/1996 | Leitch et al. |
| 5,570,367 | A | * | 10/1996 | Ayanoglu et al. ........... 370/346 |
| 5,931,964 | A | | 8/1999 | Beming et al. |
| 6,256,334 | B1 | * | 7/2001 | Adachi ....................... 375/132 |
| 6,345,185 | B1 | * | 2/2002 | Yoon et al. ................... 455/436 |
| 6,512,927 | B2 | * | 1/2003 | Hunzinger ............... 455/452.1 |
| 6,681,112 | B1 | * | 1/2004 | Schwarz et al. ............. 455/436 |
| 6,845,089 | B1 | * | 1/2005 | Gu et al. ..................... 370/337 |
| 7,085,581 | B2 | * | 8/2006 | Vanghi ....................... 455/522 |
| 7,133,675 | B2 | * | 11/2006 | Hunzinger .................. 455/437 |

(Continued)

FOREIGN PATENT DOCUMENTS

EP    0406741    1/1991

(Continued)

*Primary Examiner*—Charles N Appiah
*Assistant Examiner*—Jaime M Holliday
(74) *Attorney, Agent, or Firm*—Coats & Bennett, P.L.L.C.

(57) ABSTRACT

A wireless communication network receives packet data transmissions from a mobile station, tracks the occurrence of retransmission requests sent to the mobile station responsive thereto, and modifies the radio link assignments for the mobile station based at least in part on said tracking. For example, a base station controller may be configured to manage the active set of a mobile station based on the number and/or frequency of NACK messages sent by the radio base stations in the mobile station's active set(s) responsive to packet data transmissions from the mobile station. The ACK/NACK response of a radio base station to mobile station transmissions may be used to detect link imbalance, identify poor reverse link channels, etc. The base station controller can add or change radio links based on the ACK/NACK response to improve reverse link performance, trigger voice call handoff, correct link imbalance, etc.

24 Claims, 5 Drawing Sheets

U.S. PATENT DOCUMENTS

| | | | |
|---|---|---|---|
| 2002/0027495 A1 | 3/2002 | Darby, Jr. et al. | |
| 2002/0046379 A1* | 4/2002 | Miki et al. | 714/749 |
| 2002/0102962 A1* | 8/2002 | Grinn et al. | 455/406 |
| 2003/0002460 A1 | 1/2003 | English | |
| 2004/0077357 A1* | 4/2004 | Nakada | 455/452.1 |
| 2004/0090937 A1* | 5/2004 | Chaskar et al. | 370/331 |
| 2004/0219917 A1* | 11/2004 | Love et al. | 455/436 |
| 2004/0248575 A1* | 12/2004 | Rajala et al. | 455/436 |
| 2005/0020273 A1* | 1/2005 | Fong et al. | 455/453 |
| 2005/0180415 A1* | 8/2005 | Cheung et al. | 370/389 |

FOREIGN PATENT DOCUMENTS

| | | |
|---|---|---|
| EP | 0 984 582 | 8/1999 |
| WO | WO 99/59355 | 5/1999 |
| WO | WO 02/47402 | 6/2002 |

* cited by examiner

RADIO LINK MANAGEMENT BASED ON RETRANSMISSION REQUEST PERFORMANCE

RELATED APPLICATIONS

This application claims priority under 35 U.S.C. § 119(e) from the following provisional application: Application Ser. No. 60/486,157 filed on Jul. 10, 2003. That application is incorporated in its entirety by reference herein. This application further claims priority under 35 U.S.C. § 120 from the following utility application: application Ser. No. 10/788,568, which is entitled, "SECONDARY LINK POWER CONTROL IN A WIRELESS COMMUNICATION NETWORK," and was filed on Feb. 27, 2004. That application also is incorporated in its entirety by reference herein.

BACKGROUND OF THE INVENTION

CDMA systems use soft handoffs as one means of reducing interference. A "handoff" occurs when a mobile station moves between cells or sectors. In a traditional "hard" handoff, the connection to the current radio base station (RBS) the source base station) is broken and a connection is made with the new RBS (the target base station) to resume communication with the mobile station. This is known as a "break before make" handoff. Because all cells or sectors in a CDMA system use the same frequency, it is possible to make the connection to the target RBS before terminating the connection with the source RBS. This is known as a "make before break" or "soft" handoff. A soft handoff requires less power, which reduces interference and increases system capacity. A soft handoff is also more reliable (i.e., less dropped calls) because the new connection is made before the old connection is broken.

During operation, the mobile station measures the received signal strength of pilot signals, or pilots, from nearby cells or sectors and reports its measurements to the network in a pilot strength measurement report. A base station controller determines what pilots to include in the active set of the mobile station based on the pilot strength measurements. A soft handoff occurs when the active set of a mobile station contains two or more pilots. During a soft handoff, a mobile station may transmit and receive from two or more radio base stations.

During normal operations in a typical wireless communication network, the mobile station will be in soft handoff approximately 50 to 60% of the time. When the mobile station is not in soft handoff, the active set comprises the pilot for a single cell or sector. Both the RBS and the mobile station monitor the performance of the communication channel and can request handoffs. When a handoff is requested, the BSC adds pilots to the mobile stations' active set. As the pilot strength from a given RBS in the active set falls below a defined point as measured by the mobile station, that RBS is removed from the mobile station's active set.

There are circumstances when communications with an RBS in the active set yields poor performance even though the pilot strength measurements indicate that channel conditions are good. Such circumstances may arise, for example, when the RBSs selected based on pilot strength measurements are very heavily loaded.

SUMMARY OF THE INVENTION

The present invention comprises a method and apparatus to manage radio link assignments for mobile stations based at least in part on the retransmission requests sent to the mobile stations responsive to receiving packet data transmissions from them. In an exemplary embodiment, one or more base station controllers manage radio links between the mobile station and one or more radio base stations operating under their control. Thus, an exemplary method of managing radio link assignments for a mobile station in a wireless communication network comprises receiving information from one or more radio base stations indicating the number or frequency of retransmission requests sent by the radio base stations to the mobile station responsive to packet data transmissions from the mobile station. The method further comprises modifying the radio link assignments for the mobile station based on said information.

By way of non-limiting examples, the wireless communication network may comprise a cdma2000 network, or some variant thereof, a Wideband CDMA network, or some other type of network that provides Automatic Repeat Requests (ARQ), or some other transmit ACK/NACK mechanism, whereby incorrectly received packet data transmissions generally result in the transmission of one or more repeat requests. In this manner, base stations within the network, in addition to carrying out any underlying handoff/soft handoff mobility management algorithms implemented by the network, can track the incidence of retransmission requests being sent by the network to the mobile station as an indication that changes to the mobile station's existing radio link assignments are needed.

Broadly, then, radio link management circuits may be implemented for use in a base station system of a wireless communication network and configured to track occurrences of retransmission requests sent to a mobile station responsive to receiving packet data transmissions from the mobile station, and change radio link assignments for the mobile station based at least in part on tracking the occurrences of the retransmission requests. In this sense, changing the radio link assignments of the mobile station may be adding or moving forward radio links and/or reverse radio links. Further, it should be noted that the changed radio link assignments may pertain to any packet-switched calls ongoing with the mobile station, but additionally, or alternatively, may pertain to any circuit-switched calls ongoing with the mobile station.

For example, in a concurrent services environment, the mobile station may be engaged in a packet-switched call and concurrently engaged in a circuit-switched call (e.g., a voice or fax call). Tracking the incidence of retransmission requests sent from the network for the mobile station's transmitted packet data may be used as a mechanism for recognizing impending reception problems with regard to the voice call, and thus may serve as a triggering mechanism for handing off of the voice call, or for otherwise changing the radio link assignments currently supporting the call. This operation is an example of changing the mobile station's "voice active set" of currently designated supporting radio base stations based on retransmission request performance.

The present invention contemplates a wide range of radio link management options, even where the incidence of retransmission requests sent from the network is used just for radio links associated with packet data service. For example, the network may count or otherwise track the occurrence of retransmission requests relative to the mobile station's currently assigned reverse radio links and, as noted above, add one or more reverse radio links if the incidence of retransmission requests is too high. This operation is an example of changing the mobile station's "reduced active set" of currently designated supporting radio base stations based on retransmission request performance. The reduced active set of radio base stations for packet data service may be a subset of the voice active set.

In another example, the network may track the relative incidence of retransmission requests among the mobile station's currently assigned reverse links. That is, tracking the incidence of retransmission requests may reveal that, for a given mobile station's currently assigned reverse radio links, the network is sending more retransmission requests for one reverse radio link than for the others.

That information can be used to determine whether the worst (non-best) performing reverse radio link corresponds to the mobile station's forward link serving sector, which is usually selected as the "best" radio sector from which to serve the mobile station on the forward link. For example, in a best-effort radio network, such as TIA-856, or the high-speed packet data channels of 1xEV-DV networks, the mobile station's forward link serving sector usually is selected based on the mobile station identifying the strongest radio base station pilot signal. If the serving sector reverse radio link is not the best among the currently assigned reverse radio links, that condition is referred to as "link imbalance." If link imbalance is thus detected according to the present invention, the mobile station's serving forward sector can be changed, such as by moving it to a more lightly loaded sector.

In one or more other embodiments, retransmission request tracking may be performed additionally, or alternatively, at the mobile station. For example, a mobile station may be configured to change its indication of the currently best forward link serving sector if the sector currently identified by the mobile station as being the best one for forward link packet data service is sending excessive retransmission requests to the mobile station. Additionally, the mobile station may use the incidence of retransmission requests sent to it from one or more sectors as a mechanism to trigger voice call handoff. In this context, the mobile station is engaged in concurrent voice and data calls, and triggers handoff of the voice call if it sees too many retransmission requests from the sector(s) currently supporting the voice call.

In any case, it should be understood that the present invention is not limited to the above features and advantages. Those skilled in the art will recognize other features and advantages upon reading the following detailed description, and upon viewing the accompany figures.

DETAILED DESCRIPTION OF THE INVENTION

Figure 1:
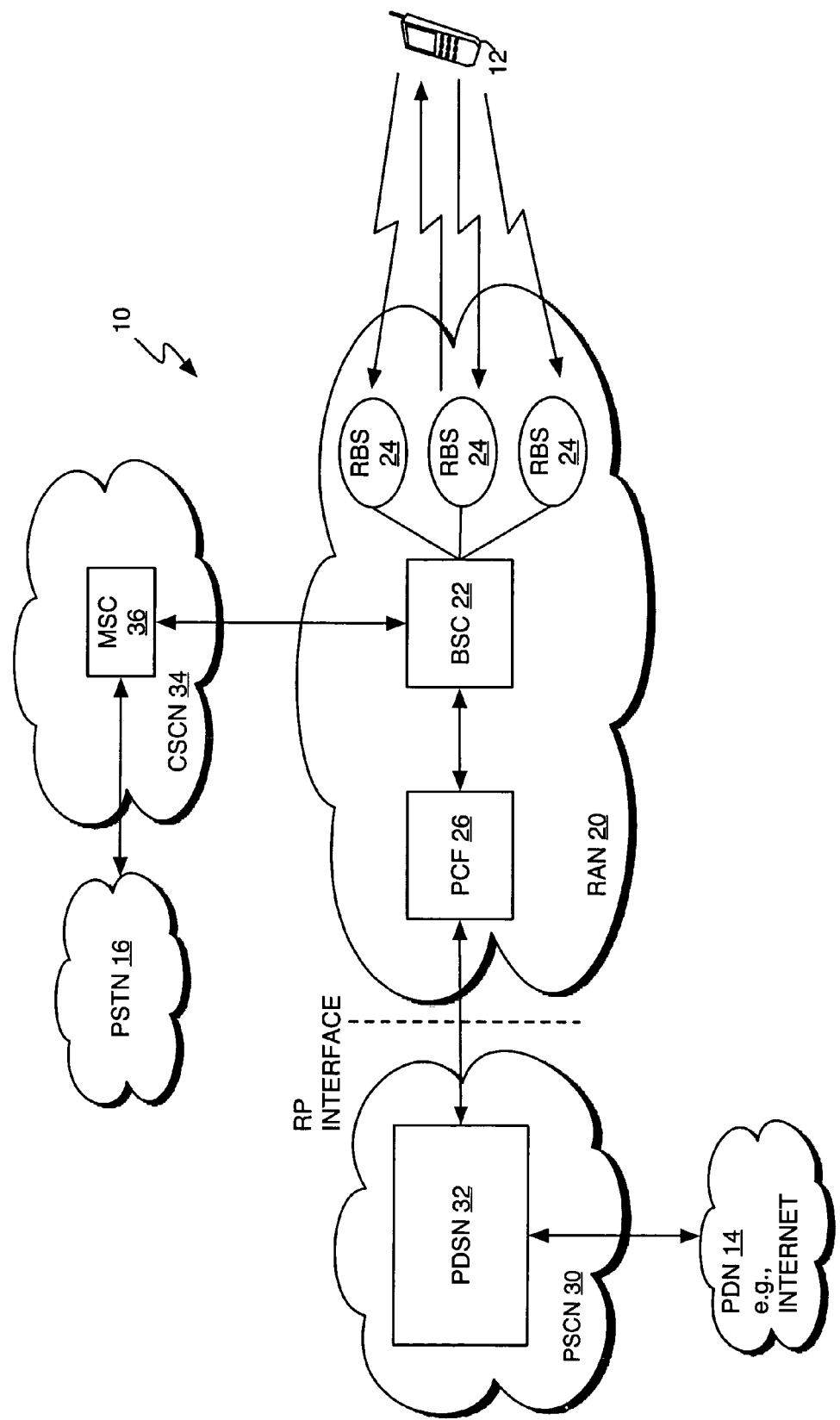
FIG. 1 is a diagram of an exemplary wireless communication network according to one or more embodiments of the present invention.

FIG. 1 illustrates an exemplary wireless communication network 10 in which the present invention may be implemented. By way of non-limiting example, network 10 may comprise a Code Division Multiple Access (CDMA) network operating according to the IS-2000 standards, e.g., it may be a 1xEV-DV network that offers circuit-switched voice/fax service and packet-switched data service, including a best-efforts forward link packet data service. Of course, network 10 may be configured according to other standards, and it should be appreciated that network 10 need not be configured as depicted, and may not offer circuit-switched service in some embodiments.

Indeed, the present invention does not depend on a particular network configuration, or particular services. Instead, the present invention is based on the proposition that retransmission requests as sent from the network to a mobile station can be used to improve communication performance by managing the mobile station's radio link assignments based at least in part on that information. Thus, the present invention has applicability in essentially any type of wireless communication network that uses some form of retransmission request mechanism (e.g., an Automatic Repeat Request mechanism, such as ACK/NACK).

Presenting this concept in the context of network 10, one notes that network 10 communicatively couples a mobile station 12 to one or more external networks, such as a Public Data Network 14 (e.g., the Internet), and the Public Switched Telephone Network (PSTN) 16. More particularly, a Radio Access Network (RAN) 20 provides wireless connection to the mobile station 12 via one or more forward radio links and one or more reverse radio links. RAN 20 comprises a Base Station Controller (BSC) 22, a number of associated Radio Base Stations (RBSs) 24, and a Packet Control Function (PCF) 26.

PCF 26 provides one end of the Radio-Packet (RP) interface that communicatively couples the RAN 20 to a Packet-Switched Core Network (PSCN) 30, which includes a Packet Data Serving Node (PDSN) 32 that directly or indirectly links the PSCN 30 to PDN 14. BSC 22 also may be linked to a Circuit-Switched Core Network (CSCN) 34, which includes a Mobile Switching Center (MSC) 36 that is coupled directly or indirectly to PSTN 16. Those skilled in the art should appreciate that other network configurations are within the scope of the preset invention, and that network 10 may, in actual implementation, include additional entities not illustrated, or may include entities different from those illustrated.

However, for this discussion, it is sufficient to note that network 10 provides one or more RBSs 24 for communicating with mobile station 12. In operation, network 10 establishes forward radio links with the mobile station 12 at one or more RBSs 24 and, similarly, establishes one or more reverse radio links with the mobile station 12 at one or more of the RBSs 24. As simple example, BSC 22 may assign a forward link traffic channel to the mobile station 12 at given one of the RBSs 24, and may set up a corresponding reverse link traffic channel, usually at the same RBS 24.

Figure 2:
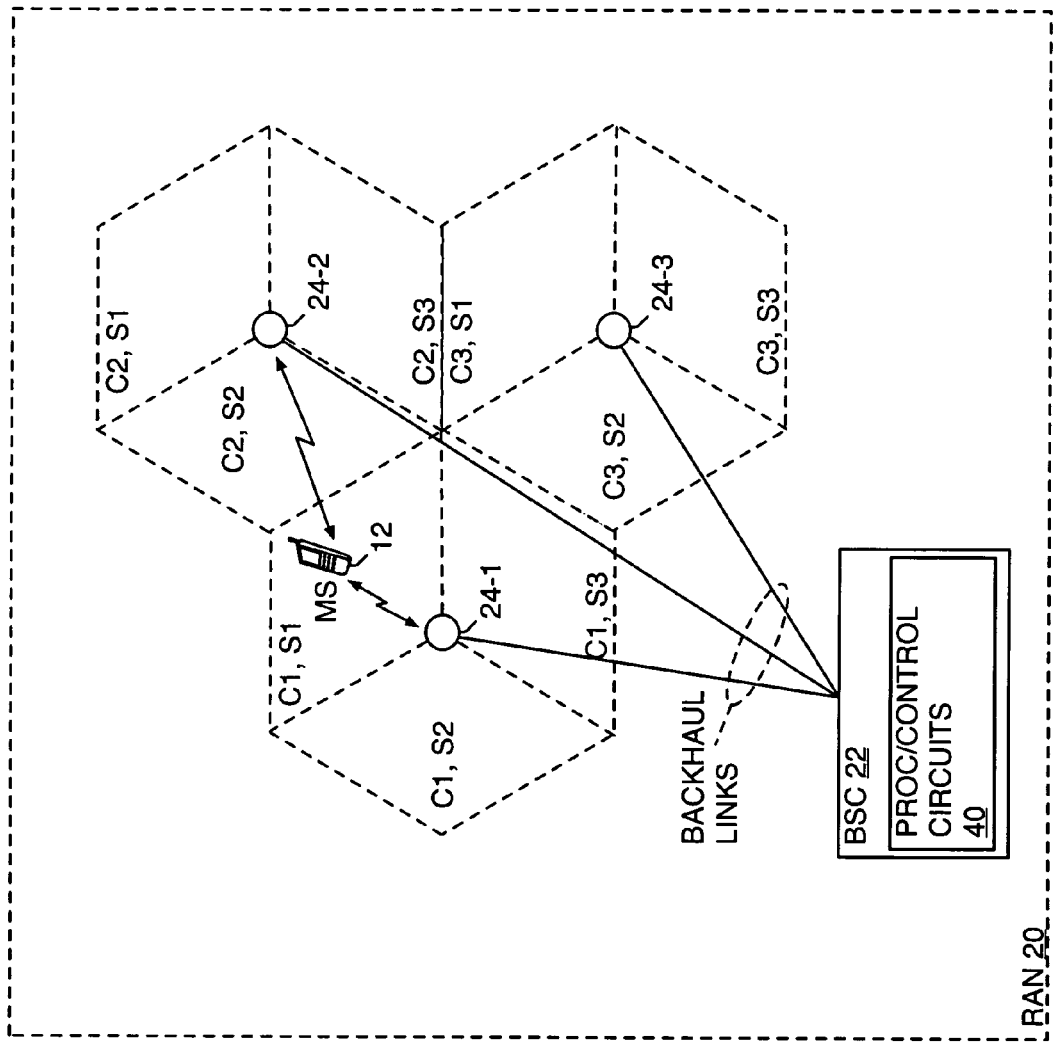
FIG. 2 is a diagram of an exemplary network sector configuration.

Of course, as the mobile station 12 moves between the coverage areas of the different RBSs 24, these traffic channel assignments may be shifted from one RBS 24 to the other, or shared between RBSs 24 on a temporary basis. FIG. 2 illustrates sectorized radio coverage areas, in which RBSs 24-1, 24-2, and 24-3, operate under control of BSC 22, with each providing three radio sectors, S1, S2, and S3. In this context, depending on where it is physically located with respect to the radio sectors, mobile station 12 may be served from one or more of the RBSs 24 by setting up forward and reverse radio links for the mobile station 12 in the appropriate sectors.

In the context of the present invention, at least one reverse radio link between the mobile station 12 and one or more of the RBSs 24 conveys reverse link packet data, and the RBS(s)

24 receiving that data provide reception feedback to the mobile station 12. In an exemplary embodiment, the network 10 is a 1xEV-DV network that provides ACK/NACK feedback to mobile station 12 responsive to receiving reverse link packet data transmissions from mobile station 12.

The ACK/NACK feedback generally is sent on a per-RBS basis. That is, ACK/NACK feedback is sent to the mobile station 12 for each reverse radio link on which the mobile station's packet data transmissions are received. Thus, if three reverse radio links are assigned to the mobile station, this typically would be done by assigning a link in each of three different sectors, mobile station 12 would receive ACK/NACK feedback from network 10 for each such link.

Figure 3:
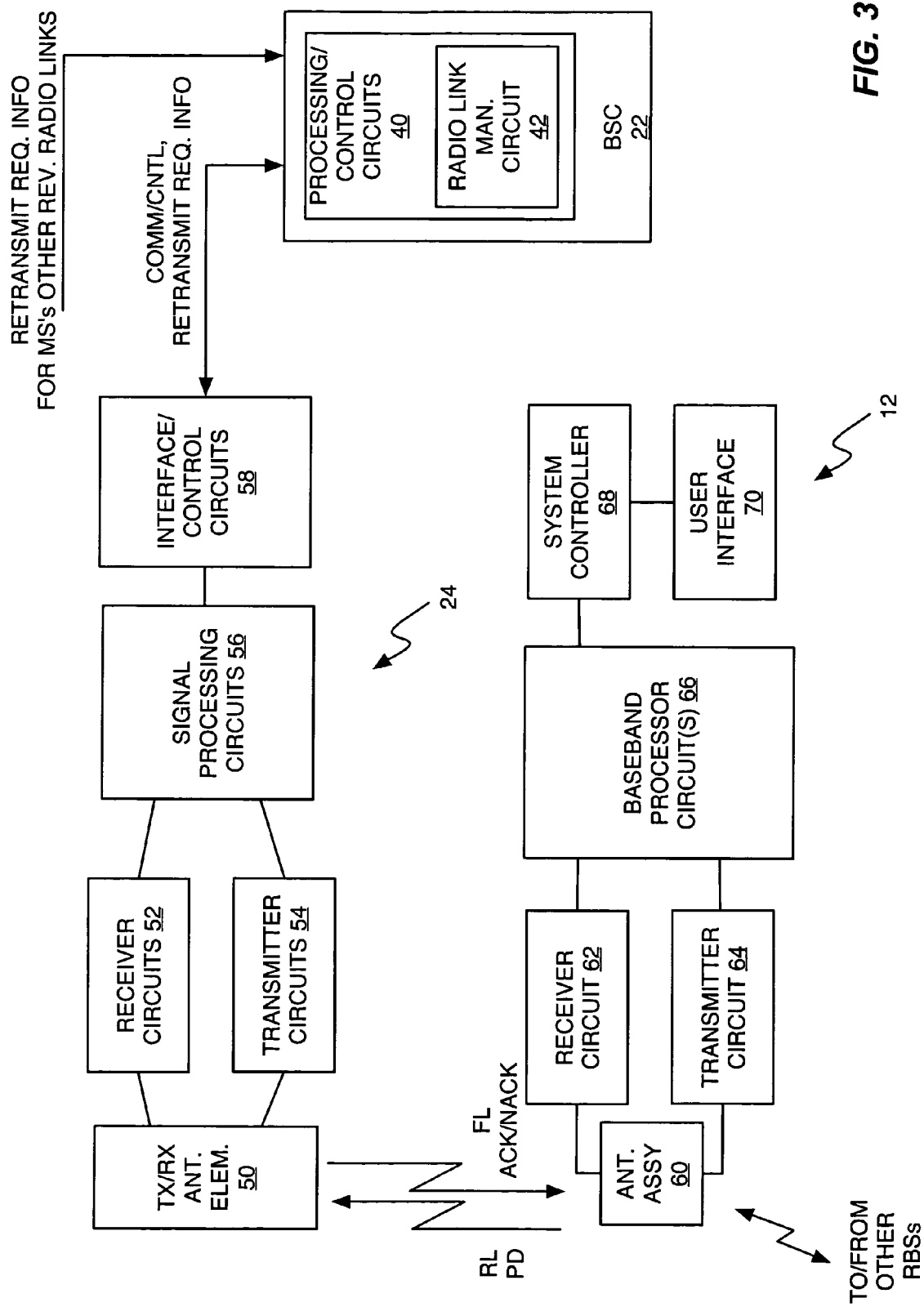
FIG. 3 is a diagram of exemplary radio base station, base station controller, and mobile station details.

FIG. 3 illustrates exemplary BSC, RBS, and mobile station details for supporting such an arrangement. The illustrated BSC 22 comprises one or more processing circuits 40, which may comprise a mix of hardware and software (e.g., microprocessors, DSPs, or other processing devices executing stored program instructions). Processing/control circuits 40 may include, in particular, a radio link management circuit 42 that comprises one or more processing circuits configured to carry out radio link management in accordance with the present invention.

The illustrated RBS 24 comprises transmit/receive antenna assemblies 50, receiver circuits 50, transmitter circuits 54, signal processing circuits 56, and interface/control circuits 58. Similarly, the illustrated mobile station 12 comprises an antenna assembly 60, a receiver circuit 62, a transmitter circuit 64, a baseband processor circuit 66, a system controller 68, and a user interface 70 (e.g., keypad, display, speakers, etc.). Note that the particular configuration of mobile station 12 is determined by its type, e.g., radio cellular telephone, Portable Digital Assistant, pager, palmtop computer, etc.

The diagram illustrates that mobile station 12 sends packet data transmissions to RBS 24 on a reverse radio link, and that RBS 24 sends retransmission requests (ACKs/NACKs) to the mobile station 12, as needed, on a forward radio link. Mobile station 12 may receive additional ACK/NACK transmissions from other RBSs 24 that currently are listening to the mobile station's reverse link packet data transmissions.

In turn, RBS 24 may be configured to provide BSC 22 with retransmission request information for the mobile station 12. For example, it may send messages or reports to the BSC 22 that indicate the incidence of retransmission requests sent to the mobile station 12. Such messages may be sent at timed intervals, or sent as event-driven reports, and can be configured to convey NACK count, for example. NACK count may be a raw count, or a qualified count, such as NACKs-in-a-row, or may be expressed in other terms, such as ACK/NACK ratio, NACK frequency, etc. Of course, BSC 22 may be configured to further process the retransmission information.

If BSC 22 is managing other RBSs 24 that also are receiving the mobile station's reverse link packet data transmissions, it may receive retransmission request information from such others. In this manner, BSC 22 can track the occurrence of retransmission requests relative to each of the mobile station's currently assigned reverse radio links, which allows BSC 22 to quickly assess which reverse radio links are performing relatively well or relatively poorly.

Figure 4:
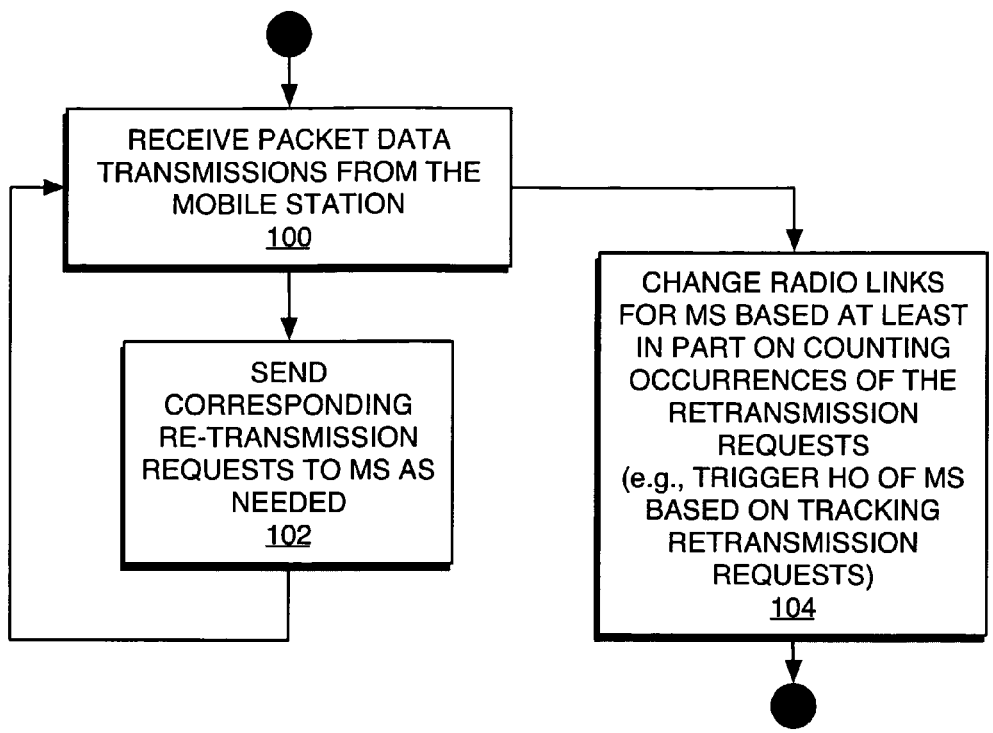
FIG. 4 is a diagram of exemplary processing logic for carrying out radio link management in accordance with the present invention.

FIG. 4 illustrates exemplary processing logic for making use of the retransmission request information, wherein processing begins with receiving packet data transmissions from the mobile station 12 (Step 100). As explained, this comprises receiving packet data from the mobile station 12 at each of one or more RBSs 24. As part of ongoing operations, each RBS 24 listening to the mobile station's reverse link packet data transmissions sends retransmission requests to the mobile station 12 as needed (Step 102).

In conjunction with that ongoing processing, BSC 22 tracks the retransmission request information being sent from the RBS(s) 24, and changes radio link assignments for the mobile station 12 based at least in part on that tracking (Step 104). That is, the RBSs 24, BSC 22, and network 10, will, in general include mobility management algorithms that enable the mobile station 12 to be handed off from one RBS 24 to another, and the exemplary radio link management of the present invention, in some cases, may be configured to complement existing handoff logic.

Figure 5:
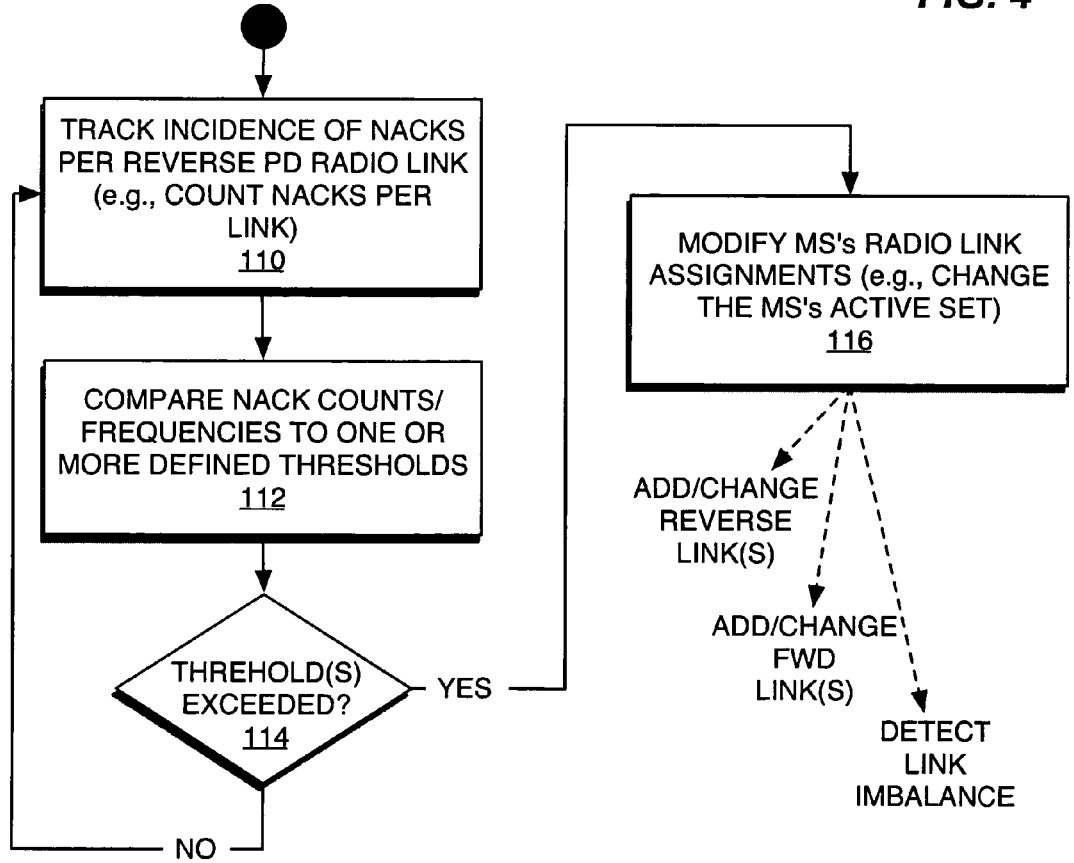
FIG. 5 is a diagram of exemplary processing logic details for FIG. 4.

In any case, FIG. 5 illustrates exemplary processing logic details for FIG. 4, wherein tracking occurrences of retransmission requests may comprise tracking the incidence of NACKs sent for each reverse radio link on which the mobile station's packet data is being received (Step 110). For example, the NACK counts for each link may be compared to one or more defined thresholds (e.g., define count limits), or the NACK counts can be combined for comparison to some limit threshold (Step 112). By way of non-limiting examples, limit criteria can be a maximum allowed number of consecutively NACKed packet data transmissions from the mobile station 12, a maximum number of NACKs over a given interval, etc.

Regardless of how it is measured, if the incidence of NACKs exceeds one or more defined thresholds (Step 114), then BSC 22 modifies the mobile station's radio link assignments (Step 116). Modifying the mobile station's radio link assignments may comprise modifying the mobile station's active set by adding or changing the mobile station's currently assigned reverse radio links, by adding or changing the mobile station's currently assigned forward links, or by detecting a forward/reverse link imbalance condition and changing forward and/or reverse link assignments responsive thereto.

In a simple example, assume the mobile station 12 has one packet data reverse radio link allocated to it. If the incidence of retransmission requests sent by the network for packet data transmissions received from the mobile station 12 on that one link is excessive, the network 10 may attempt to improve reception performance by assigning a new reverse link to the mobile station 12.

As noted before, the network may logically maintain one or more active sets of RBSs that are designated for supporting the mobile station 12. Where a voice active set is maintained for supporting voice service, and a subset of the voice active set, i.e., a reduced active set, is maintained for supporting packet data service, a RBS from the voice active set can be added to the reduced active set, or a new RBS can be added to both the voice and reduced active sets. When adding a new RBS in that manner, the network may make use of neighbor list information, etc.

Thus, the present invention enables management of the mobile station's active set(s), i.e., the RBSs currently designated to support the mobile station 12, based on tracking retransmission requests being sent from the network 10 to the mobile station 12. Such management may comprise triggering a handoff of the mobile station 12 if the occurrence of retransmission requests on one or more of the currently assigned reverse radio links exceeds one or more count thresholds. Such triggering may be based on counting the number of consecutive bad packet data frames received from the mobile station 12 (as indicated by the retransmission requests), counting the frequency of bad frames, etc. Such triggering can be based on the retransmission requests being sent for any one individual reverse radio link, or based on some joint evaluation of the retransmission requests being sent for two or more reverse radio links.

As noted, the triggered handoff may comprise handoff of an ongoing voice call, such as by recognizing a high incidence retransmission request being sent by the network to the mobile station 12 for a reverse radio link that is in the radio sector(s) currently supporting the voice call. Of course, the triggered handoff may comprise handing off a packet-switched call that is ongoing with the mobile station. That packet-switched call may the same one for which the retransmission requests are being sent.

With regard to packet-switched calls, the mobile station 12 may be being served on the forward link using a best-effort channel that is, with respect to the mobile station 12, "steered" from radio sector to radio sector based on signal quality or strength indications returned from the mobile station 12 for its active set RBSs 24. Note that mobile station 12 may return such reports, e.g., pilot strength measurement messages, based on measuring the pilot strengths of active sent RBSs 24 and, possibly, one or more candidate RBSs 24.

In any case, the prior discussion noted that link imbalance occurred where the radio sector currently designated as the best forward link sector for serving the mobile station 12 on the best-effort channel does not have the best reverse link performance. As noted previously, this condition can be detected by comparing the incidence of retransmission requests sent for the reverse radio link in the current serving sector to see whether it has a higher incidence of retransmissions than the mobile station's other reverse radio links that are carrying the same packet data to the network 10.

In an exemplary embodiment, the RBSs 24 that are members of the mobile station's active set, e.g., its reduced active set for packet data service, are configured to send retransmission request information to the BSC 22 on a periodic basis. The periodicity can be constrained based on RBS-BSC backhaul load, BSC message processing load, etc., and the information may comprise, for example, ACK/NACK reports. Specifically, if the network 10 is configured to use Hybrid ARQ (H-ARQ), BSC 22 may receive periodic H-ARQ reports from the member RBSs in the active set. Periodic reporting represents an exemplary approach to limiting the network overhead associated with tracking retransmission request performance in the context of the present invention.

However, the BSC 22 can be configured to obtain immediately updated ACK/NACK information from the active set RBSs when needed. For example, each member RBS 24 can be configured to send a H-ARQ report to BSC 22 responsive to the incidence of retransmission requests exceeding a defined threshold at that RBS 24. Upon receiving such an indication from one of the member RBSs, the BSC 22 can be configured immediately to request updated H-ARQ reports from the other member RBSs, such that the retransmission request performances for the member RBS can be evaluated.

Such a configuration can be implemented as an alternative, or as an addition, to the above periodic reporting scheme. In other words, RBSs 24 can be configured to accumulate retransmission request statistics for periodic reporting to the BSC 22 and/or RBSs 24 can be configured to send such reports as needed, such as when excessive retransmission requests at a given RBS 24 trigger its reporting to the BSC 22. Thus, as noted earlier, at least a portion of the radio link management functionality can be implemented at the RBS level by configuring the interface/control circuits 58 of RBS 24 to perform retransmission request tracking and/or threshold evaluation functions.

Of course, RBSs 24 can simply report raw ACK/NACK statistics to BSC 22, and BSC 22 can perform the threshold evaluations, link-to-link relative performance comparisons, etc. Further, it should be understood that some equipment vendors implement base station systems in forms other than the BSC-RBS framework illustrated herein. By way of non-limiting example, some or all of the BSC processing can be moved down to the RBS level, in which case it should be understood that potentially more retransmission request performance evaluation may be performed at that level.

With respect to BSC-level processing however, it may be noted that the exemplary BSC 22 may make use of Radio Link Protocol (RLP) layer statistics in the context of the present invention. For example, BSC 22 may have a RLP re-sequencing buffer that is used to detect missing RLP frame sequence numbers from the mobile station 12. The re-sequencing buffer is set after performing frame-selection at the BSC 22 from the various RBS(s) in the mobile station's active set. Here, frame-selection denotes the process whereby the BSC 22 determines, for a given frame transmission by the mobile station 12, whether any active set RBSs 24 correctly received that frame.

Hence, the rate of RLP NACKs sent by the BSC 22 can be used for comparison with the rate of H-ARQ NACKs being sent from an active set RBS 24. if the rate of H-ARQ NACKs being sent from an active set sector exceeds a threshold due to link-imbalance and the RBS 24 from that sector sent a H-ARQ NACK report to the BSC 22, the BSC 22 can react to that report immediately without waiting for the latest H-ARQ report from the other members in the active set.

For example, in a link imbalance situation, the BSC RLP NACK rate will be within the target Frame Error Rate (FER) threshold for the mobile station 24 if there is more than one active set member. In other words, if the FER target is set to 1%, then the FER threshold under normal operating conditions bound the rate of sending RLP NACKs. However, if one of the RBS 24 in the active set sends a H-ARQ NACK report indicating link-imbalance, and the other RBSs 24 in the active set have not, the BSC can rely on its RLP NACK rate to trigger a change of active set members to relieve the link imbalance condition, i.e., change active set membership to remove the imbalanced radio link.

Further, when mobile station 12 is in soft handoff with two RBSs 24 (RBS A and RBS B), an ACK could be sent by RBS B, which successfully received a given packet data transmission from the mobile station 12, while a NACK could be sent from RBS A for that same transmission. In this case, it is enough that one of the two RBSs 24 correctly received the transmission from the mobile station 12, so it is not necessary for mobile station 12 to retransmit the data.

Given that possibility, the RBSs 24 may be configured to track not only the ACK/NACK transmissions sent by them individually, but also to track the number of times the mobile station 12 ignores their retransmission requests. When an RBS 24 sends a retransmission request to the mobile station 12 that is ignored, this implies that either the mobile station 12 misinterpreted the request, or, the more likely case, that the mobile station 12 received an ACK from another RBS 24 for the same mobile station transmission.

Such a configuration permits a decentralized approach to retransmission request tracking, wherein each RBS 24 can track its own retransmission requests and, inferentially, track the performance of other reverse radio links in use by the mobile station 12. Thus, each RBS 24 knows something about the relative performance of its reverse radio link without requiring explicit communications between the RBSs 24. Of course, retransmission requests statistics, such as raw ACK/NACK counts, can be passed from each RBS 24 to the BSC 22 via the back-haul for centralized operations. BSC 22 can be configured to evaluate the statistics for the radio links in use, such as by making individual or joint calculations. Based on those calculations, then, BSC 22 can determine whether call performance can be improved, or otherwise made more robust, based on adding or changing radio link assignments for the mobile station.

Figure 7:
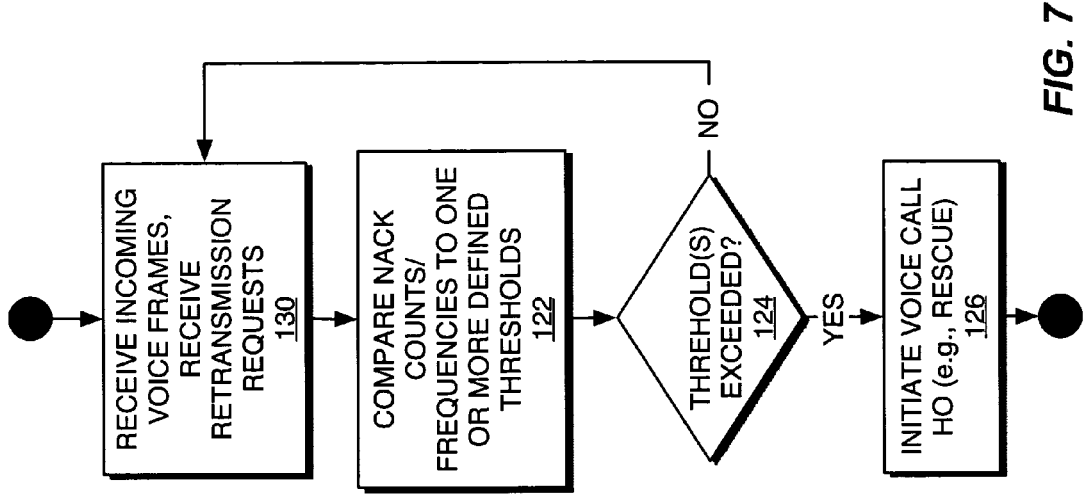
FIGS. 6 and 7 are diagrams of exemplary retransmission request tracking at a mobile station.
Figure 6:
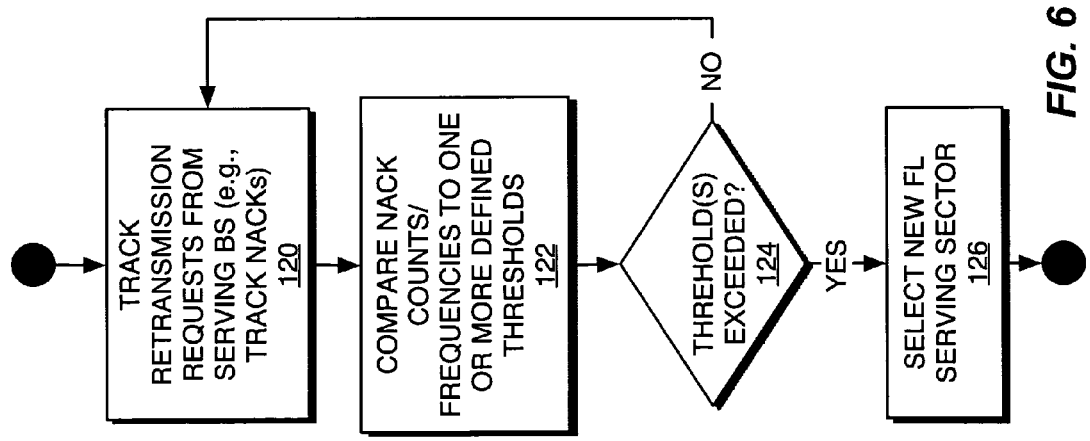

In still further embodiments of the present invention, retransmission request tracking may be carried out additionally, or alternatively, at the mobile station 12. FIGS. 6 and 7 illustrate exemplary mobile station processing logic that can be implemented in one or more processing circuits at the mobile station 12, e.g., in the mobile station's baseband circuits 66 and/or the mobile station's system controller 68. It should be understood that these circuits may comprise one or more Field Programmable Gate Arrays (FPGAs), Application Specific Integrated Circuits (ASICs), Complex Programmable Logic Devices (CPLDs), microprocessors, microcontrollers, or any other such processing circuits and supporting devices, e.g., memory, clocks, etc.

As such, the illustrated logic may be implemented in hardware, software, or any combination thereof. Regardless, in FIG. 6, one sees processing logic wherein the mobile station 12 is configured to track retransmission requests from a serving base station (BS) (Step 120). Here, the serving BS may be the RBS 24 currently providing the mobile station 12 with packet data on a best-effort packet data channel, such as the Forward Packet Data Channel (F-PDCH) used in 1xEV-DV networks, the High Data Rate channel used in TIA-856 networks, or the High Speed Downlink Packet Data channel used in W-CDMA. As noted before, network 10 may dynamically switch serving sectors based on pilot strength reports or other signal quality indicators sent from mobile station 12.

Tracking retransmission requests for the reverse radio link in that serving sector thus provides the mobile station 12 with an additional mechanism for evaluating whether the designated serving sector should be changed. Thus, processing continues with the mobile station 12 comparing the serving sector's incidence of retransmission requests to the mobile station 12 with one or more defined thresholds (e.g., NACK count limits, ACK/NACK ratio limits, etc.) (Step 122). If any such thresholds are exceeded (Step 124), the mobile station 12 can select a new serving sector (Step 126).

By way of non-limiting example, the mobile station 12 may be configured to select a new serving sector by changing its indication of the current "best" forward link. In other words, the mobile station 12 can identify another RBS 24 as the "best" one for forward link service if the RBS 24 in the currently designated best serving sector is sending excessive retransmission requests to the mobile station 12. Such changes in the preferred "best" serving sector may be conveyed to the network 10 by, for example, changing the encoding on Channel Quality Indicators (CQIs), or other quality reports, sent by the mobile station 12 to the network 10.

Once such information is received at the network 10, the BSC 22 may select the active set RBS having the next best reported signal strength as the new serving sector for the mobile station 12, or may make such selection based on evaluating the relative sector loadings, i.e., it may place the mobile station's forward link in a more lightly loaded sector. Of course, BSC 22 may make the serving sector assignment based on striking a balance based on the reported signal qualities and the relative sector loadings.

Further, the mobile station 12 may have indicated its preferred serving sector based on identifying which of its reverse radio links had the best ACK/NACK performance. In that case, BSC 22 may designate sector having that best reverse link as the mobile station's new serving sector, or at least may give it some weighting preference as a candidate for selection as the serving sector during its comparison of relative sector loadings.

Turning then to FIG. 7, one sees exemplary mobile station processing wherein mobile station 12 triggers handoff of an ongoing voice call based on tracking reverse link retransmission requests from RBSs 24 in its active set that are supporting concurrent packet data services. In this context, the term "voice" call connotes circuit-switched calls that are handled by the CSCN 34, which may be voice, fax, etc.

Processing is based on the mobile station 12 receiving incoming voice frames on the voice call, while receiving retransmission requests for the concurrent packet data service (Step 130). As before, the mobile station 12 can compare the incidence of retransmission requests to one or more thresholds to determine whether the occurrence of retransmission requests is excessive (Step 122).

If so (Step 124), the mobile station 12 can initiate a handoff of the mobile station's voice call (Step 126) based on the assumption that excessive retransmission requests from the network indicate poor or deteriorating reverse link conditions, which portend impending reception problems for the voice call. In one sense, the mobile station 12 is thus configured to initiate a "rescue" of its concurrent voice call based on monitoring reception feedback it receives from the network for concurrent packet data services.

In particular, an exemplary mobile station 12 may be configured to determine whether the network is sending an excessive number of NACKs for the reverse radio link(s) corresponding to the network sector(s) supporting the voice call. For example, the mobile station 12 may be configured to count consecutive retransmit requests received by it for one or more of its reverse radio links. If excessive NACKs are received by the mobile station 12, it infers that voice call performance can be improved by adding or changing radio links for supporting the voice call, i.e., the mobile station 12 triggers voice call handoff to reduce the risk of the voice call being dropped.

The mobile station may be configured to use the above rescue mechanism in conjunction with another rescue mechanism, so that either mechanism triggers rescue. For example, the mobile station 12 may be configured to trigger voice call handoff responsive to excessive NACKs and responsive to receiving too many bad voice frames in a row, e.g., twelve bad voice frames. However, since the packet data frame rate may be higher than the voice frame rate, and because ACK/NACK feedback from the network 10 is available at least at the packet data frame rate, the NACK-based voice call rescue of FIG. 7 may provide a faster, essentially preemptive, mechanism for voice call rescue.

With the above exemplary embodiments in mind, one sees that tracking retransmission requests provides a basis for managing the mobile station's radio link assignments. For network 10, retransmission request tracking may be performed in whole or in part at the RBSs or at the BSCs, or at some combination thereof. Alternatively, or additionally, mobile station 12 may be configured to perform such tracking, such as to trigger serving sector reassignment, or for voice call rescue triggering.

In all cases, retransmission request tracking may be based on tracking the retransmission requests sent by network 10 on a per reverse link basis, on a comparative basis among the active reverse radio links, or with respect to specific reverse radio links, e.g., those links corresponding to the mobile station's serving sector for packet data, or to the sector(s) corresponding to concurrent voice call support. The tracking itself may by way of non-limiting examples be based on detecting the consecutive occurrences of NACKs, the accumulated count of NACKs over a given window of time, the ratio of ACKs/NACKs for a given number of frames, etc.

As such, it should be understood that the present invention is not limited by these exemplary details, nor is it limited by the illustrated network and mobile station architectures. Indeed, the present invention is limited only by the following claims and the reasonable equivalents thereof.

What is claimed is:

1. A method of improving communication performance in a wireless communication network comprising:
   receiving packet data transmissions on each of one or more currently assigned reverse radio links at the network from the mobile station;
   sending corresponding retransmission requests to the mobile station as needed; and
   changing radio link assignments for the mobile station based at least in part on tracking occurrences of the retransmission requests at the network by changing a forward radio link assignment if the relative counts of retransmission requests for the currently assigned reverse radio links indicate a forward/reverse radio link imbalance.

2. The method of claim 1, wherein changing radio link assignments for the mobile station based at least in part on tracking occurrences of the retransmission requests further comprises triggering a handoff of the mobile station if the occurrence of retransmission requests on one or more of the currently assigned reverse radio links exceeds one or more count thresholds.

3. The method of claim 2, further comprising defining the one or more count thresholds such that handoff triggering is based on counting consecutive retransmission request occurrences.

4. The method of claim 2, further comprising defining the one or more count thresholds such that handoff triggering is based on determining the incidence of retransmission request occurrences over one or more periods of time.

5. The method of claim 2, further comprising counting occurrences of retransmission requests relative to each currently assigned reverse radio link and triggering handoff if the count of retransmission request occurrences on any currently assigned reverse radio link exceeds a count threshold.

6. The method of claim 2, further comprising counting occurrences of retransmission requests relative to each currently assigned reverse radio link and triggering handoff if a combined count of retransmission request occurrences for the currently assigned reverse radio link exceeds a count threshold.

7. The method of claim 2, wherein triggering a handoff of the mobile station if the occurrence of retransmission requests on one or more of the currently assigned reverse radio links exceeds one or more count thresholds comprises triggering handoff of a circuit-switched call that is ongoing with the mobile station.

8. The method of claim 2, wherein triggering a handoff of the mobile station if the occurrence of retransmission requests on one or more of the currently assigned reverse radio links exceeds one or more count thresholds comprises triggering handoff of a packet-switched call that is ongoing with the mobile station.

9. The method of claim 1, wherein changing the forward radio link assignment comprises changing the forward radio link assignment for a packet-switched call ongoing with the mobile station.

10. The method of claim 1, wherein changing radio link assignments for the mobile station based at least in part on tracking occurrences of the retransmission requests further comprises assigning a new reverse radio link to receive the packet data transmissions from the mobile station if the count of retransmission requests on the currently assigned reverse radio links exceeds one or more count thresholds.

11. A radio link management circuit for use in a base station system of a wireless communication network, the radio link management circuit comprising one or more processing circuits configured to:
   track occurrences of retransmission requests sent to a mobile station responsive to receiving packet data transmissions from the mobile station, wherein the packet data transmissions from the mobile station are received on each of one or more currently assigned reverse radio links;
   change radio link assignments for the mobile station based at least in part on tracking the occurrences of the retransmission requests by changing a forward radio link assignment if the relative counts of retransmission requests for the currently assigned reverse radio links indicate a forward/reverse radio link imbalance.

12. The radio link management circuit of claim 11, wherein the radio link management circuit is further configured to change radio link assignments for the mobile station by triggering a handoff of the mobile station if the occurrence of retransmission requests on one or more of the currently assigned reverse radio links exceeds one or more count thresholds.

13. The radio link management circuit of claim 12, wherein the radio link management circuit is configured to trigger handoff based on counting consecutive retransmission request occurrences on at least one of the one or more reverse radio links.

14. The radio link management circuit of claim 12, wherein the radio link management circuit is configured to trigger handoff based on determining the incidence of retransmission request occurrences over one or more periods of time.

15. The radio link management circuit of claim 12, wherein the radio link management circuit is configured to track the occurrence of retransmission requests relative to each currently assigned reverse radio link and trigger handoff if the count of retransmission request occurrences on any currently assigned reverse radio link exceeds a count threshold.

16. The radio link management circuit of claim 12, wherein the radio link management circuit is configured to trigger handoff if a combined count of retransmission request occurrences for the currently assigned reverse radio link exceeds a count threshold.

17. The radio link management circuit of claim 12, wherein the radio link management circuit is configured to trigger handoff of a circuit-switched call that is ongoing with the mobile station if the occurrence of retransmission requests on one or more of the currently assigned reverse radio links exceeds one or more count thresholds.

18. The radio link management circuit of claim 12, wherein the radio link management circuit is configured to trigger handoff of a packet-switched call that is ongoing with the mobile station if the occurrence of retransmission requests on one or more of the currently assigned reverse radio links exceeds one or more count thresholds.

19. The radio link management circuit of claim 11, wherein the radio link management circuit is configured to change forward radio link assignments for the mobile station by changing a forward radio link assignment for a packet-switched call ongoing with the mobile station.

20. The radio link management circuit of claim 11, wherein the radio link management circuit is further configured to assign a new reverse radio link to receive the packet data transmissions from the mobile station if the count of retransmission requests on the currently assigned reverse radio links exceeds one or more count thresholds.

21. The radio link management circuit of claim 11, wherein the radio link management circuit comprises part of a base station controller.

22. The radio link management circuit of claim 11, wherein the radio link management circuit comprises part of a radio base station.

23. A method of improving communication performance in a wireless communication network comprising:

assigning one or more forward radio links and one or more reverse radio links to communicate with a mobile station; and changing the radio link assignments for the mobile station based at least in part on tracking at the network the occurrence of retransmission requests sent to the mobile station responsive to receiving packet data transmissions from the mobile station over one or more currently assigned reverse radio links by changing a current forward radio link assignment responsive to determining that the relative incidence of retransmission requests among the currently assigned reverse radio links indicates a link imbalance.

24. The method of claim 23, wherein changing radio link assignments for the mobile station based at least in part on tracking the occurrence of retransmission requests sent to the mobile station comprises assigning one or more new reverse radio links to the mobile station responsive to determining that the incidence of retransmission requests on one or more of the currently assigned reverse radio links exceeds a defined threshold.

* * * * *

UNITED STATES PATENT AND TRADEMARK OFFICE
CERTIFICATE OF CORRECTION

PATENT NO.         : 7,469,146 B2                                                           Page 1 of 1
APPLICATION NO. : 10/889554
DATED              : December 23, 2008
INVENTOR(S)        : Soong et al.

It is certified that error appears in the above-identified patent and that said Letters Patent is hereby corrected as shown below:

On the Title Page, in Field (60), under "Related U.S. Application Data", in Column 1, Line 3, insert -- Claims priority from Application Ser. No. 10/788,568 filed on Feb. 27, 2004. --.

Drawings
In Fig. 5, Sheet 4 of 5, in Box "114", Line 1, delete "THREHOLD(S)" and insert -- THRESHOLD(S) --, therefor.

In Fig. 6, Sheet 5 of 5, in Box "124", Line 1, delete "THREHOLD(S)" and insert -- THRESHOLD(S) --, therefor.

In Fig. 7, Sheet 5 of 5, in Box "124", Line 1, delete "THREHOLD(S)" and insert -- THRESHOLD(S) --, therefor.

In Column 8, Line 23, after "RBS 24." delete "if" and insert -- If --, therefor.

Signed and Sealed this

Twenty-third Day of February, 2010

David J. Kappos
*Director of the United States Patent and Trademark Office*